United States Patent [19]
Richards

[11] Patent Number: 5,843,200
[45] Date of Patent: Dec. 1, 1998

[54] PRODUCT AND PROCESS FOR MOLDING GLASS LENSES

[75] Inventor: David A. Richards, Rochester, N.Y.

[73] Assignee: Eastman Kodak Company, Rochester, N.Y.

[21] Appl. No.: 639,674

[22] Filed: Apr. 29, 1996

Related U.S. Application Data

[60] Provisional application No. 60/002,050 Aug. 8, 1995.
[51] Int. Cl.$^6$ ..................................................... C03B 23/00
[52] U.S. Cl. ........................... 65/102; 428/428; 428/432; 428/212; 65/60.1; 65/60.5; 65/64; 65/39
[58] Field of Search ................................ 65/37, 39, 60.1, 65/60.5, 64, 102; 428/428, 432

[56] References Cited

U.S. PATENT DOCUMENTS

| | | | |
|---|---|---|---|
| 3,898,093 | 8/1975 | Faulstich et al. | 106/54 |
| 3,975,093 | 8/1976 | Upton | 351/164 |
| 5,148,322 | 9/1992 | Aoyama et al. | 264/1.4 |

*Primary Examiner*—A. A. Turner
*Attorney, Agent, or Firm*—Svetlana Z. Short

[57] ABSTRACT

A glass preform, including a core glass adversely affected by interaction with a molding tool, is provided with a thin surface layer of glass components that are inert to the tool and have an index of refraction that matches the core glass. More specifically, the thin layer comprises glass components having respective indexes of refraction above and below the core index of refraction, in an amorphous mixture that matches the core index. According to certain features, the core glass is flint glass including greater than five percent by weight of titania, and the glass components include mixtures of silica or indium and tin oxide applied in a layer having a thickness between one hundred and one thousand angstroms. Other features of the invention provide a method for making the glass preform and a method for molding a precision optical element using the preform.

10 Claims, 2 Drawing Sheets

PRODUCT AND PROCESS FOR MOLDING GLASS LENSES

CROSS REFERENCE TO RELATED APPLICATION

Reference is made to and priority claimed from U.S. Provisional application Ser. No. U.S. 60/002,050, filed 08 Aug. 1995, entitled PRODUCT AND PROCESS FOR MOLDING GLASS LENSES.

DESCRIPTION

1. Field of Invention

The invention relates to the field of optics and to processes and products for molding glass lenses. More specifically, the invention relates to the application of surface coatings to glass cores for reducing adverse interactions with shaping tools when the cores are molded into functional optical elements.

2. Background of the Invention

Precision optical elements traditionally are manufactured from glass blanks in a multi-step process that includes separate operations for rough and fine grinding and polishing. Quality can be outstanding, but the process is slow with many interruptions for measurements and changeovers. Results often are inconsistent, depending on the skill and experience of the operator. Aspheric shapes, considered desirable in many optical systems, are particularly difficult to produce in quantity.

More recent processes use compression molding to press glass into acceptable lens elements without further finishing. It has been found, for example, that molding tools surfaced with a glass ceramic can be fabricated with a surface quality suitable for molding certain glasses into precision optical elements. The shape of the optical surface is formed with adequate quality by pressure against the molding tool without further grinding or polishing. Examples are disclosed by Blair, Angle and others in U.S. Pat. No. 3,833,347, issued Sep. 3, 1974; and U.S. Pat. No. 4,168,961, issued Sep. 25, 1979.

Although recent molding techniques provide many advantages for certain glasses, other desirable glasses have proven more difficult, due to their chemical compositions and related properties. Some glasses have an affinity for the material of the molding tool, or a surface layer may decompose under the temperatures and pressures of the molding process. Sticking and staining results, sometimes including bubbles in the optical surface. I have found, for example, that titania bearing glasses, sometimes referred to as light flints, are reduced at the surface during the molding process. A gas is produced during the process that cannot escape through the non-porous molding tool. Instead, bubbles are formed in the surface of the optical element while the glass is in a fluid or plastic state.

Anti-reflection coatings make the problem even more difficult, as will be explained more specifically in connection with the detailed description of the invention.

SUMMARY OF THE INVENTION

The present invention is directed to overcoming one or more of the problems set forth above. Briefly summarized, according to one aspect of the invention, a glass preform, including a core glass adversely affected by interaction with a molding tool, is provided with a thin surface layer of glass components that are inert to the tool and have an index of refraction that matches the core glass. More specifically, the thin layer comprises glass components having respective indexes of refraction above and below the core index of refraction, in an amorphous mixture that matches the core index. According to certain features, the core glass is flint glass including greater than five percent by weight of titania, and the glass components include mixtures of silica or indium and tin oxide applied in a layer having a thickness between one hundred and one thousand angstroms. In a preferred embodiment, the layer is applied to the core by sputtering in an environment of argon including some oxygen.

Other features of the invention provide a method for making a glass preform for a precision optical element. A glass core that reacts adversely with molding tools is coated with a thin layer comprising glass components inert to the tools and having an index of refraction matching the index of the glass core. The preferred core glass is a flint including greater than five percent by weight of titania, and the glass components include silica or indium and tin oxide combined to match the core index of refraction. According to a more specific feature, the coating layer is formed by combining glass components having respective indexes of refraction above and below the core index of refraction. The components are mixed or blended in proportions to match the core index of refraction.

The invention also includes a method for molding a precisely configured operative surface of an optical element. This method includes the steps of: 1) providing a glass core having a predetermined index of refraction desired for the optical element, the glass core reacting adversely with the molding tools under molding conditions; 2) coating the glass core with a thin layer comprising glass components inert to the tools for isolating the core from the tools, the coating matching the index of refraction of the core; and, 3) pressing the coated core against the tools for generating the precisely configured operative surface. The coating layer is an amorphous mixture of glass components having respective indexes of refraction above and below the core index of refraction, and preferably is applied with a multi-source coater.

The invention permits molding of a wider variety of glasses to precise optical tolerances for surface quality and figure. It provides a preform and a resulting precision optical element that have desirable properties for the molding operation and subsequent coating operations, specifically anti-reflection coatings that are not complicated or degraded by the coating layer. The coating layer isolates the glass core from deleterious interaction with the molding tool, without complicating or negatively effecting typical subsequent coating operations.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
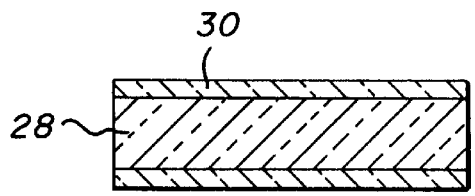
FIG. 1 is a cross-sectional view of a glass preform according to a preferred embodiment of the invention.
Figure 2:
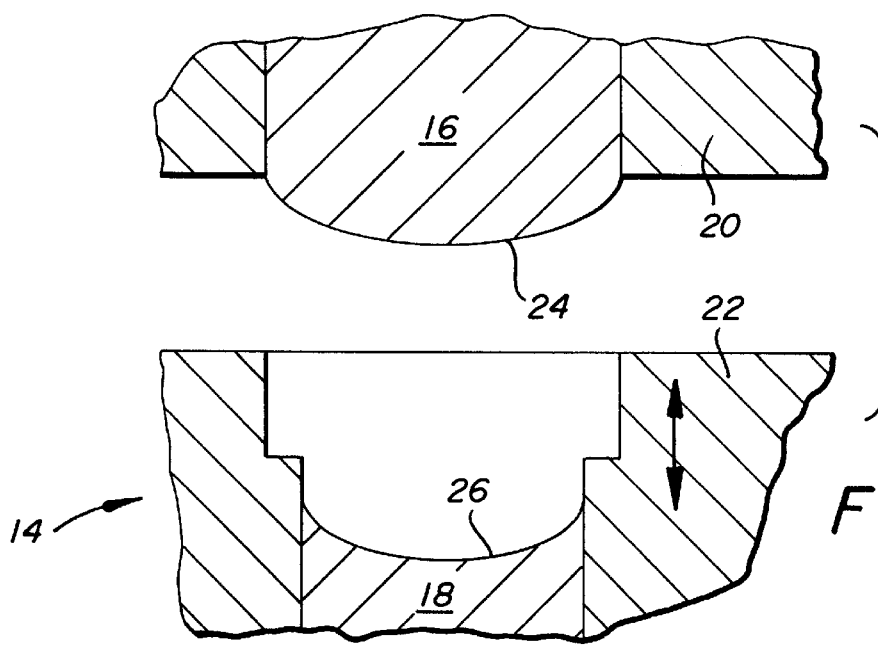
FIGS. 2 and 3 are cross-sectional views of mold parts including tools for molding the preform of FIG. 1 into a precision optical element according to the preferred embodiment.
Figure 3:
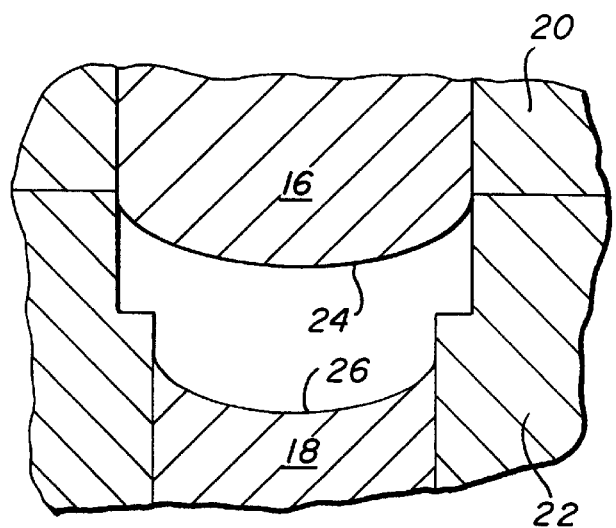

Referring now to the drawings, and beginning with FIGS. 1–3, a preferred embodiment of the invention is depicted including a preform 12 and pressure mold 14. The preform 12 is used to manufacture a precision optical element under pressure between tools or tool inserts 16 and 18, which are also called nubbins. The tools 16 and 18 are formed of rigid silicon carbide, having a very smooth glass-like surface, and are carried by relatively moveable upper and lower mold bodies 20 and 22. Compression between the upper and lower mold bodies 20 and 22 captures and presses the preform against tool surfaces 24 and 26, changing the shape of the preform and remapping its surface according to the configuration of the tool surfaces.

Preform 12 is a plano—plano circular disk having a glass core 28 and a thin surface layer 30. In FIG. 1, the surface layer is depicted as covering the upper and lower portions of the glass core, with the core exposed around its peripheral edges. It should be understood, however, that the layer 30 may cover the core entirely, including its peripheral edges, or the layer may be limited to desired surface areas of the core as required to achieve the results and advantages taught by the present invention.

In the preferred embodiment, the glass core is a light flint referred to as SFS-57 glass, having a thickness of approximately three and a half millimeters (3.5 mm) and a diameter of approximately fifteen millimeters (15 mm). SFS-57 glass includes eight percent titania by weight, and has been found to produce bubbles in the surface of the glass when molded according to prior art techniques. Other glasses having more than approximately five percent by weight of titania demonstrate similar problems. The bubbles apparently are formed by interaction between the glass and the surfaces of the molding tools that contact the glass. Since the tool surfaces are impervious, the bubbles blow into and remain in the glass surface when it is in a fluid or plastic state produced by the molding operation. Although this phenomenon is described in the preferred embodiment in connection with glasses containing titania, the invention in its broader aspects is applicable also to other glasses and effects resulting from deleterious interactions between the surfaces of the glass and the molding tools or agents during the molding operation. Examples of other such glasses include the fluorides, phosphates and high lead content glasses which have detrimental chemical reactions with the release agents, tool materials and/or the molding environment.

The preferred surface layer 30 is a thin, homogeneous film of glass components (including glass) that are inert to the tool surfaces 24 and 26 and other agents that contact the preform during the molding operation. The surface layer shields or isolates the glass core from deleterious interaction with the tool surfaces and other agents. Examples of preferred materials include oxides, such as silica-tin oxide and indium-tin oxide, applied as a layer that has a substantially uniform thickness in the range between one hundred angstroms and one thousand angstroms. The preferred thickness depends on the geometry of the optical surface, it is a strong function of the strength of curvature, and whether the layer is in tension or compression during cool down. When the optical surface is pressed into a convex shape, the surface layer goes into tension on cool down, and the layer should be toward the thinner end of the range. When the surface layer is concave and goes into compression on cool down, layers at the thicker end of the range are permitted. Thinner coatings tend to take on the macro properties of the substrate, such as the coefficient of thermal expansion, reducing the likelihood of crazing and other deleterious effects. The surface layer generally should be as thin as possible, but thick enough to prevent "punch through" when the preform surface is remapped into the surface of the molded optic. Thermal characteristics of the layer, such as expansion and flow, also should be considered.

According to an important feature of the invention, the index of refraction of the surface layer should match the index of refraction of the core glass. When the preform is pressed into its final shape, the surface of the preform, including the surface layer, is remapped to the configuration of the tool surface. The surface layer thickness varies over the operative surface of the resulting optic, and the layer variations are in general unpredictable. If the surface layer has a significantly different index of refraction than the core glass, the layer will cause problems with subsequent coatings, particularly subsequent anti-reflection coatings. The surface layer, if it has a different index of refraction, acts as an unpredictably non-uniform additional layer that produces poor results with subsequent coatings such as anti-reflection. A single layer anti-reflection coating, for example, will perform with the surface layer as if the combination were a multi-layer coating. According to a feature of the present invention, this complication is eliminated by matching the index of refraction of the surface layer to the index of refraction of the core glass. Although a perfect match is not required, a closer match produces better results.

As already mentioned, the glass core 28 includes materials that react adversely with the molding tools 16 and 18, or at least their molding surfaces 24 and 26. The preform surface layer 30, on the other hand, comprises materials that do not react adversely with the molding surfaces 24 and 26. The surface layer isolates the core glass from the mold surfaces, and further matches the index of refraction of the core to simplify and remove undesirable optical effects in the molded optic and to facilitate subsequent anti-reflection and other coating operations. Since the index of refraction of the surface layer matches the core glass, the surface layer does not act as an independent layer for determining appropriate anti-reflection and other coatings.

In order to produce the preferred surface layer with the desired index of refraction, an amorphous or glass-like, non-crystalline blend of materials is used having respective indexes of refraction above and below the desired index. According to the preferred embodiment, Silica ($SiO_2$), having an index of 1.5, is blended with tin-oxide ($SnO_2$), having an index of 2.0, to produce layers with indexes ranging from 1.5 to 2.0. This covers the majority of optically interesting glasses. Other examples of components include indium and yttrium oxide. The materials mentioned in this paragraph have the further advantage of approximating the core indexes of dispersion and coefficients of thermal expansion.

Figure 4:
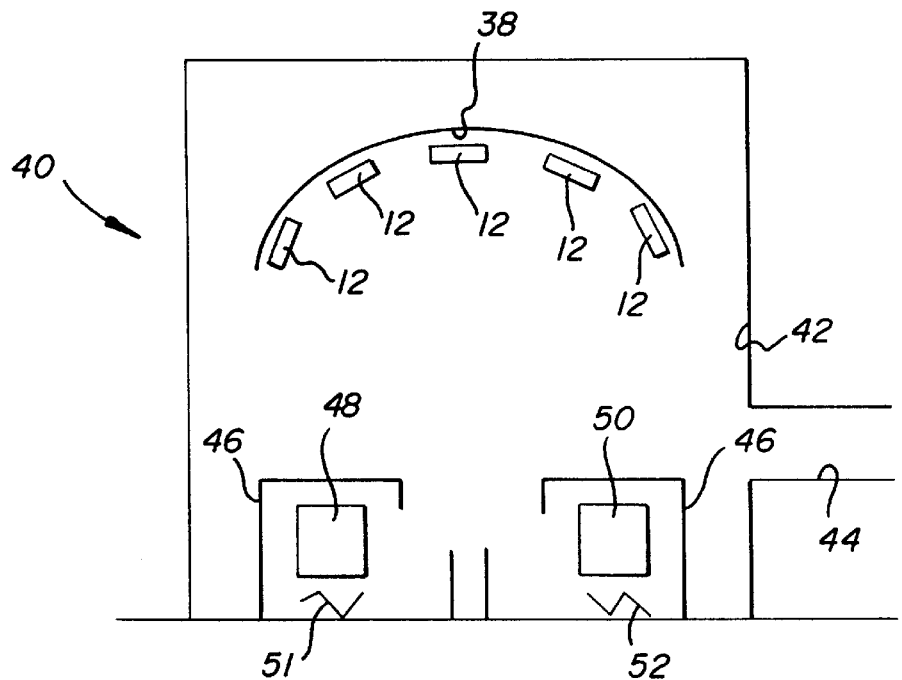
FIG. 4 is a schematic view of apparatus for coating the preform of FIG. 1 according to the preferred embodiment.

Referring now to FIG. 4, a method and apparatus are depicted for blending and coating preform 12 with a thin homogeneous layer of indium tin-oxide in an amorphous or non-crystalline state. A plurality of preforms 12 are placed under a preform holder 38 in a two source coater 40. The coater includes a vacuum chamber 42 having an exhaust 44 for vacating the chamber and heating elements 46 for controlling its internal temperature. Separate sources, each containing fundamental glass components, such as silica 48 and tin oxide 50, are placed in the chamber and evaporated onto the preform in proportions that will produce a layer having the desired index. The rate of evaporation, and the blending proportions, are controlled by heating elements 51 and 52. Other techniques include chemical vapor deposition, sputtering and sol gel spin coatings applied in a manner similar to photo-resist applications.

Figure 5:
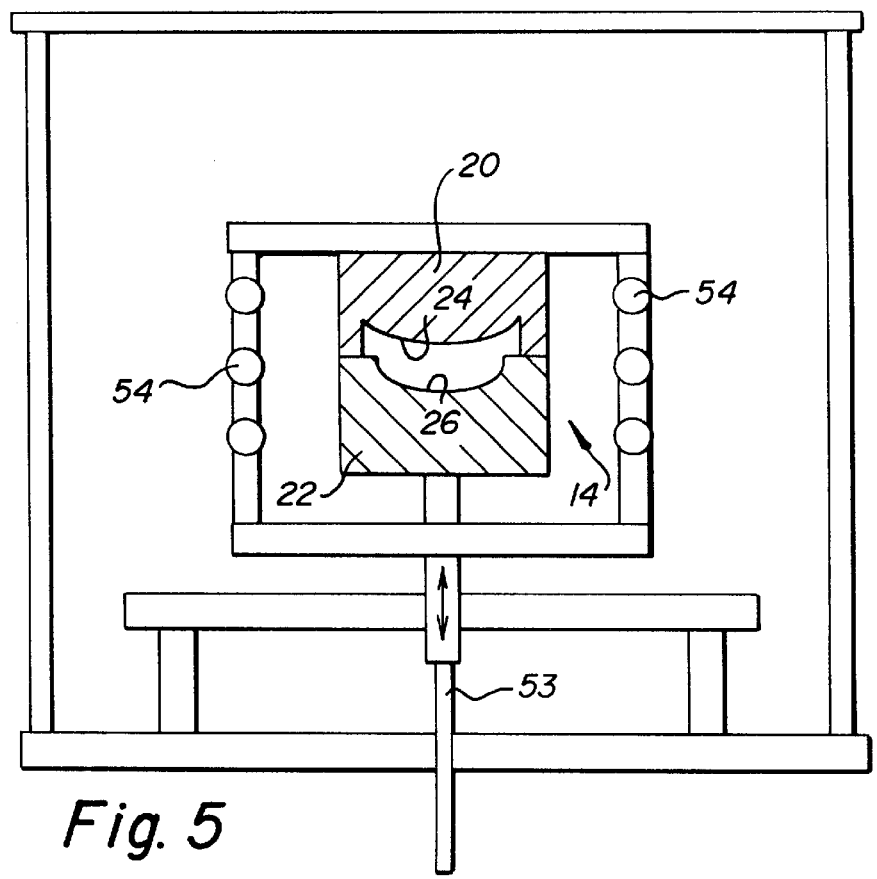
FIG. 5 is a schematic view of apparatus for molding precision optical elements from the preform of FIG. 1 according to the preferred embodiment.

FIG. 5 represents the pressure molding operation that converts the preform into a precision optical element by pressing the preform 12 against the tool surfaces 24 and 26. The upper and lower mold bodies, 20 and 22, respectively, are moved relative to one another by a piston 53, compressing the preform between the tool surfaces. Heating elements 54 are induction heating coils that heat the materials in the chamber during the process to approximately six hundred and eighty degrees Celsius, for SFS-57, or typically within a range of five hundred degrees Celsius to seven hundred degrees Celsius for other optical glasses. Again, the molding process and apparatus can be selected from known designs, including those disclosed, for example, in previously mentioned U.S. Pat. Nos. 3,833,347 and 4,168,961.

The optic that is depicted in this preferred embodiment is a negative meniscus lens having a concave upper surface with a radius of seventeen millimeters, a convex lower surface with a radius of twenty five millimeters and a central thickness of two and a half millimeters. Such an optic was molded, according to one example, at six hundred seventy eight degrees Celsius from a preform having the dimensions outlined above and sputter coated with a blend of indium and tin oxide in a carrier of argon including ten percent oxygen.

It should now be apparent that an improved preform, method of making a preform and method of molding a preform are disclosed having many features and advantages not previously available from the teaching of the prior art. The preform includes a thin surface layer that remains with the final optic without complicating subsequent coating operations.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
| --- | --- |
| 12. | Preform |
| 14. | Pressure mold |
| 16. | Upper mold tool |
| 18. | Lower mold tool |
| 20. | Upper mold body |
| 22. | Lower mold body |
| 24. | Upper tool surface |
| 26. | Lower tool surface |
| 28. | Glass core |
| 30. | Surface layer |
| 38. | Preform holder |
| 40. | Two source coater |
| 42. | Vacuum chamber |
| 44. | Exhaust |
| 46. | Shutters |
| 48. | Silica |
| 50. | Tin oxide |
| 51. | Heating element |
| 52. | Heating element |
| 53. | Piston |
| 54. | Induction coil heating element |

I claim:

1. A method of making a precision optical element formed by molding a glass preform against a tool precisely configured to generate an operative surface of the optical element; characterized by:

forming a glass core having a predetermined index of refraction in the shape of said preform and applying to said glass core, at the operative surface, a thin layer comprising glass components inert to said tool and having an index of refraction matching said core index of refraction.

2. The invention of claim 1, wherein said core glass is flint glass including greater than five percent by weight of titania, and said glass components include silica and tin oxide combined to match said index of refraction.

3. The invention of claim 1, wherein said thin layer is formed by combining glass components inert to said tool and having respective indexes of refraction above and below said core index of refraction.

4. The invention of claim 3, wherein said layer comprises indium and tin oxide applied to said core in an environment of argon including some oxygen.

5. A method of molding a precisely configured operative surface of an optical element; characterized by:

providing a glass core having a predetermined index of refraction desired for said optical element, said glass core having an affinity for said tool under parameters of said molding;

coating said glass core with a thin layer comprising glass components inert to said tool for isolating said core from said tool, said coating matching said index of refraction of said core; and, pressing said coated core against said tool for generating said precisely configured operative surface.

6. The invention of claim 5, wherein said thin layer comprises an amorphous mixture of glass components inert to said core and having respective indexes of refraction above and below said core index of refraction.

7. The invention of claim 6, wherein said core glass is flint glass including greater than five percent by weight of titania, and said glass components include silica and tin oxide combined to match said index of refraction.

8. The invention of claim 6, wherein said layer is applied to a thickness between one hundred angstroms and one thousand angstroms.

9. The invention of claim 6, wherein said layer is deposited in a multisource coater blending indium and tin oxide in an environment of argon including some oxygen.

10. The invention of claim 6, wherein said layer is applied by a process selected from evaporative coating, sputtering, chemical vapor deposition, and spin coating sol gel.

* * * * *